United States Patent [19]

Rudolf, III et al.

[11] Patent Number: 5,456,560
[45] Date of Patent: Oct. 10, 1995

[54] METHOD AND APPARATUS FOR MOVING CONTAINERS BETWEEN A SHIP AND A DOCK

[75] Inventors: C. Davis Rudolf, III; Anthony P. Simkus, Jr., both of Virginia Beach, Va.

[73] Assignee: Virginia International Terminals, Inc., Norfolk, Va.

[21] Appl. No.: 258,371

[22] Filed: Jun. 10, 1994

Related U.S. Application Data

[63] Continuation of Ser. No. 8,953, Jan. 26, 1993, abandoned.

[51] Int. Cl.⁶ ............................................ B63B 27/12
[52] U.S. Cl. ............................. 414/140.3; 414/141.3; 414/139.7
[58] Field of Search ............................. 212/204, 206, 212/208, 219

[56] References Cited

U.S. PATENT DOCUMENTS

| | | |
|---|---|---|
| 1,192,016 | 7/1916 | Stuart . |
| 1,373,464 | 4/1921 | Titcomb . |
| 2,050,821 | 8/1936 | Vercoe . |
| 3,102,642 | 9/1963 | Zweifel . |
| 3,168,955 | 2/1965 | Black . |
| 3,471,040 | 10/1969 | Field . |
| 3,532,227 | 10/1970 | Tax ............................. 212/219 |
| 3,543,952 | 12/1970 | Young ............................. 414/140.3 |
| 3,675,786 | 7/1972 | Wilson ............................. 212/206 |
| 3,696,947 | 10/1972 | Ponsen ............................. 212/206 |
| 3,812,987 | 5/1974 | Watatani . |
| 3,881,608 | 5/1975 | Hopkes ............................. 414/141.3 |
| 3,958,106 | 5/1976 | Bedford et al. . |
| 4,046,265 | 9/1977 | Wormmeester et al. . |
| 4,049,132 | 9/1977 | Stromback ............................. 414/141.3 |
| 4,106,639 | 8/1978 | Montgomery et al. . |
| 4,172,685 | 10/1979 | Nabeshima et al. . |
| 4,196,814 | 4/1980 | Reich ............................. 212/204 |
| 4,279,347 | 7/1981 | Appleman . |
| 4,293,077 | 10/1981 | Makino . |
| 4,599,027 | 7/1986 | Knapp . |
| 4,747,745 | 5/1988 | Pippen et al. . |
| 4,753,357 | 6/1988 | Miyoshi et al. ............................. 414/140.7 |
| 4,858,775 | 8/1989 | Crouch ............................. 212/206 |
| 4,990,046 | 2/1991 | Tax et al. ............................. 414/917 |
| 5,048,703 | 9/1991 | Tax et al. ............................. 414/139.7 |

FOREIGN PATENT DOCUMENTS

| | | |
|---|---|---|
| 2265664 | 11/1975 | France . |
| 1756411 | 4/1970 | Germany . |
| 51650 | 4/1977 | Japan . |
| 27945 | 3/1978 | Japan . |
| 502830 | 9/1976 | U.S.S.R. . |
| 994391 | 2/1983 | U.S.S.R. . |

*Primary Examiner*—Michael S. Huppert
*Assistant Examiner*—Gregory A. Morse
*Attorney, Agent, or Firm*—Popham, Haik, Schnobrich & Kaufman, Ltd.

[57] ABSTRACT

The present invention relates to a dockside crane for moving cargo between a dock and a water-borne vessel. The crane has an elongated girder extending horizontally over the dock and the vessel. The crane can vertically raise and lower the girder to change its elevation, so as to minimize distance and time travel for the cargo. A trolley moves horizontally on the girder, and has a cargo engaging device which is lowered to and raised from cargo locations on the dock and vessel. The cargo engaging device can be raised sufficiently adjacent to the trolley, and may be held tightly thereagainst, to permit large horizontal accelerations and velocities with virtually no attendant sway of the trolley or cargo. Advantageously, an operator cab is provided which moves independently of the trolley, so that the operator can view the load from a variety of angles throughout the cargo moving process.

30 Claims, 4 Drawing Sheets

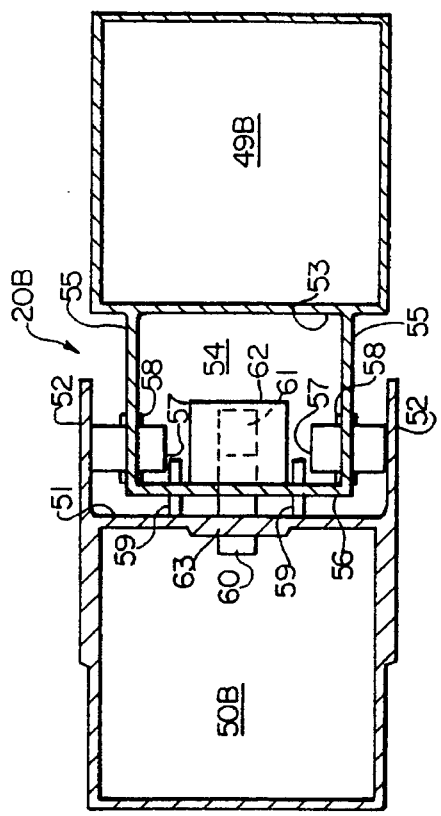
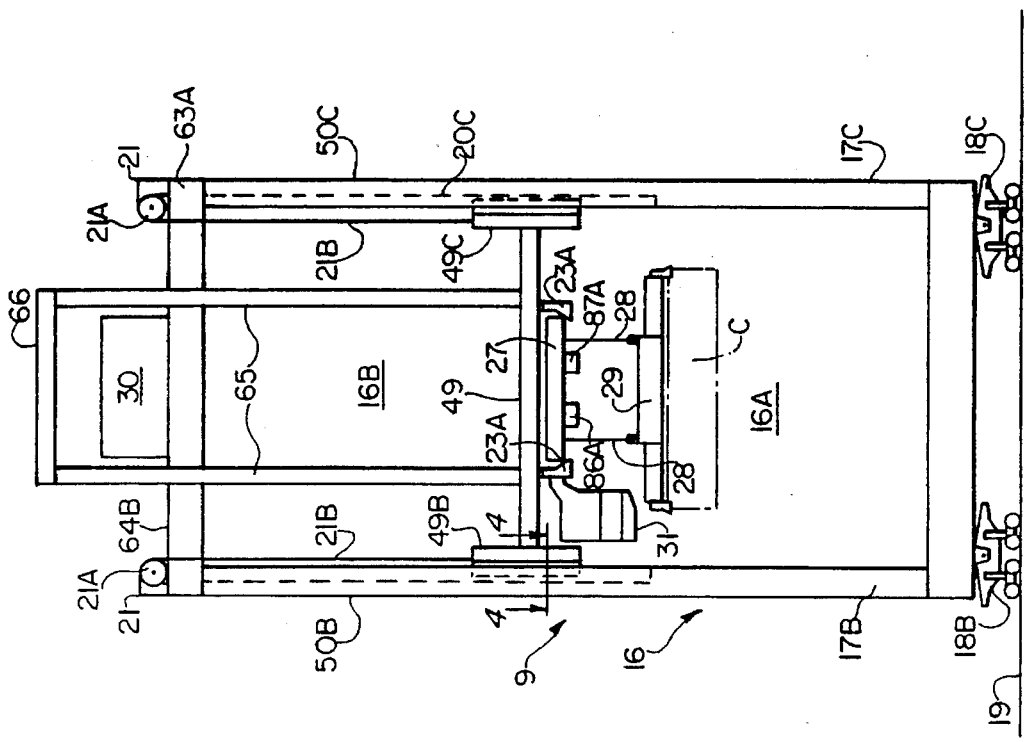
FIG. 4
FIG. 3

METHOD AND APPARATUS FOR MOVING CONTAINERS BETWEEN A SHIP AND A DOCK

This application is a File Wrapper Continuation of U.S. patent application Ser. No. 08/008,953, filed Jan. 26, 1993, now abandoned.

FIELD OF THE INVENTION

The present invention relates to apparatus and methods for transporting a load between various locations. In particular, the invention is concerned with improvements in the construction and operation of a crane for transferring cargo containers between a dock and a ship.

BACKGROUND OF THE INVENTION

During the past several decades major changes have occurred in the handling of seagoing cargo between ships and the dock. The most noteworthy development has been the evolution and utilization of container ships and container cranes. Container ships allow the handling of cargo packed in standardized rectangular containers which allow their systematic movement by appropriately configured equipment from location to location and the stacking of these containers for storage and further handling. A container crane is a large, dockside, gantry crane that can move lengthwise on railroad rails along the dock. This type of crane typically has a large, horizontal trolley beam or girder which is vertically and permanently fixed at some particular elevation and extends over a ship moored alongside a dock. Along this trolley girder is a moveable carriage or trolley which rides on the beam. Wire ropes on the trolley suspend a lift beam, also known as a spreader, which is designed to engage the corners of a cargo container by a device called a twist lock. One twist lock type of mechanism is described in a Loomis et al. U.S. Pat. No. 3,749,438. The trolley is operable along the trolley girder, part of which is called a boom if it can be pivotally raised or lowered about a hinge point, for carrying a cargo container through the entire horizontal distance between the dock and the ship. Vertical hoisting or lowering of a container by the trolley along this horizontal path is also possible which allows clearance of any obstacles in the path.

This typical single hoisting trolley container crane has several shortcomings, among which is the fact that the permanently fixed trolley girder must be located high enough to be able to work above many different sizes of vessels. Because the girder must be positioned and fixed at such a high elevation, there is an increase in operator parallax and in the distance to where the spreader is to be positioned for attachment to a container. Although this type of single hoist crane can be designed for horizontal trolley travel at increasingly higher speeds in an attempt to realize better operating cycle times, the fact that the container load is usually suspended some distance below the trolley by wires creates undesirable sway characteristics which oppose a decrease in the overall cycle time.

In recognizing the limitations of single hoist cranes, other prior art proposals have included the utilization of a dual hoist type of crane which breaks the operating cycle into two separate phases in a manner very similar to what is known by fire fighters as a bucket brigade. A bucket brigade allows the faster passing of pails of water from person to person, as opposed to persons running individually from the source of the water to the fire site. Examples of dockside container cranes using dual hoist principles are described in the following U.S. Pat. Nos.: 3,812,987 (Watatani); 4,046,265 (Wormmeester et al.); 4,106,639 (Montgomery et al.); 4,172,685 (Nabeshima et al.); 4,293,077 (Makimo); and 4,599,027 (Knapp).

These patents describe various types of cranes, some utilizing a stationery intermediate platform with a second hoisting trolley, others using elevating intermediate platforms. Although a higher productivity can be realized through the utilization of an intermediate platform, such breaking of the cycle into two parts complicates the equipment and makes it considerably more expensive. The fact that two operators are also required to operate a dual hoist crane additionally and significantly raises the operating cost of the equipment.

SUMMARY OF THE INVENTION

Accordingly, it is an object of the present invention to provide a dockside crane having a horizontal trolley girder extending over the dock and a moored vessel that can be raised or lowered for allowing the trolley girder to be positioned at any number of elevations between its lower and upper extreme positions, with a trolley operable along this girder and having a spreader to lift cargo from and set cargo on the dock and the ship.

Another object of the invention resides in the improvement whereby the trolley girder is placed as close to the operating level on the ship as safety and clearance permit so that a load, when moved to or from the ship, can be quickly raised by the spreader which is held tightly against the trolley in order that the trolley and load can be moved at high accelerations and speeds along the length of the girder without sway.

A further object of the present invention is to minimize vertical hoist distance in a dockside crane through the lowering of the trolley girder to the lowest possible elevation which allows the load to clear any obstacles on the ship.

Yet another object of the present invention is to provide an operator cab riding independently on the trolley girder at its low elevation so that the operator is at a closer vantage point when removing or placing a load, which allows quicker and more precise movement for making these spotting maneuvers.

The invention also involves certain method aspects which are directly related to the physical techniques used in the vertically moveable trolley girder. One method involves a sequence of steps whereby the trolley girder is positioned at one elevation while operating the trolley to place cargo or remove cargo from one tier on the ship, then when that tier is loaded or discharged the trolley girder is moved to a second elevation for operating the trolley to place cargo and remove cargo from another tier on the ship. In this respect the method generally involves the process of vertically moving the trolley girder to an elevation which corresponds approximately to the higher of the following: (A) The elevation which minimizes the distance between the bottom of the spreader when it is hoisted tightly to the trolley, and the top of a designated container location on the ship to or from which a container is to be moved, or (B) The elevation which minimizes the distance between the bottom of a container attached under the spreader when it is hoisted tightly to the trolley, and the highest obstacle to be cleared by the container when it is transferred between the dock and the designated container location on the ship. When the trolley girder is at the approximate height determined by these parameters, the trolley can be operated to move cargo between the dock and the ship. These elevations apply to containers located above the deck or in removing or loading containers from the hold of the ship.

These and other objects of the present invention are achieved in a dockside crane by providing vertical frame means including support structure which rests on the dock near a waterside edge thereof; elongated girder means attached to said vertical frame means and extending horizontally over said dock and the water adjacent to said dock where a vessel can be moored for loading or unloading cargo; elevating means for vertically raising and lowering said girder means to change its elevation above said dock and a moored vessel; cargo transfer means carried by said girder means and horizontally moveable therealong over said dock and a moored vessel; and cargo engaging means suspended below said cargo transfer means by flexible support means and which can be vertically lowered to and raised from cargo locations on said dock and on a moored vessel, wherein said cargo engaging means can be raised sufficiently adjacent to said cargo transfer means, and preferably is held tightly thereagainst, so as to permit large horizontal accelerations and velocities of said transfer means with virtually no attendant sway of any cargo being transported thereby.

BRIEF DESCRIPTION OF THE DRAWINGS

FIG. 3 is a simplified diagrammatic waterside or front end elevation view of the crane which primarily shows the general arrangement of the trolley and spreader when the trolley girder is at an intermediate elevation.

FIG. 4 is a top sectional plan view of a fixed lower superstructure leg and its associated moveable platform corner vertical leg.

DETAILED DESCRIPTION OF THE PREFERRED EMBODIMENT

Figure 1:
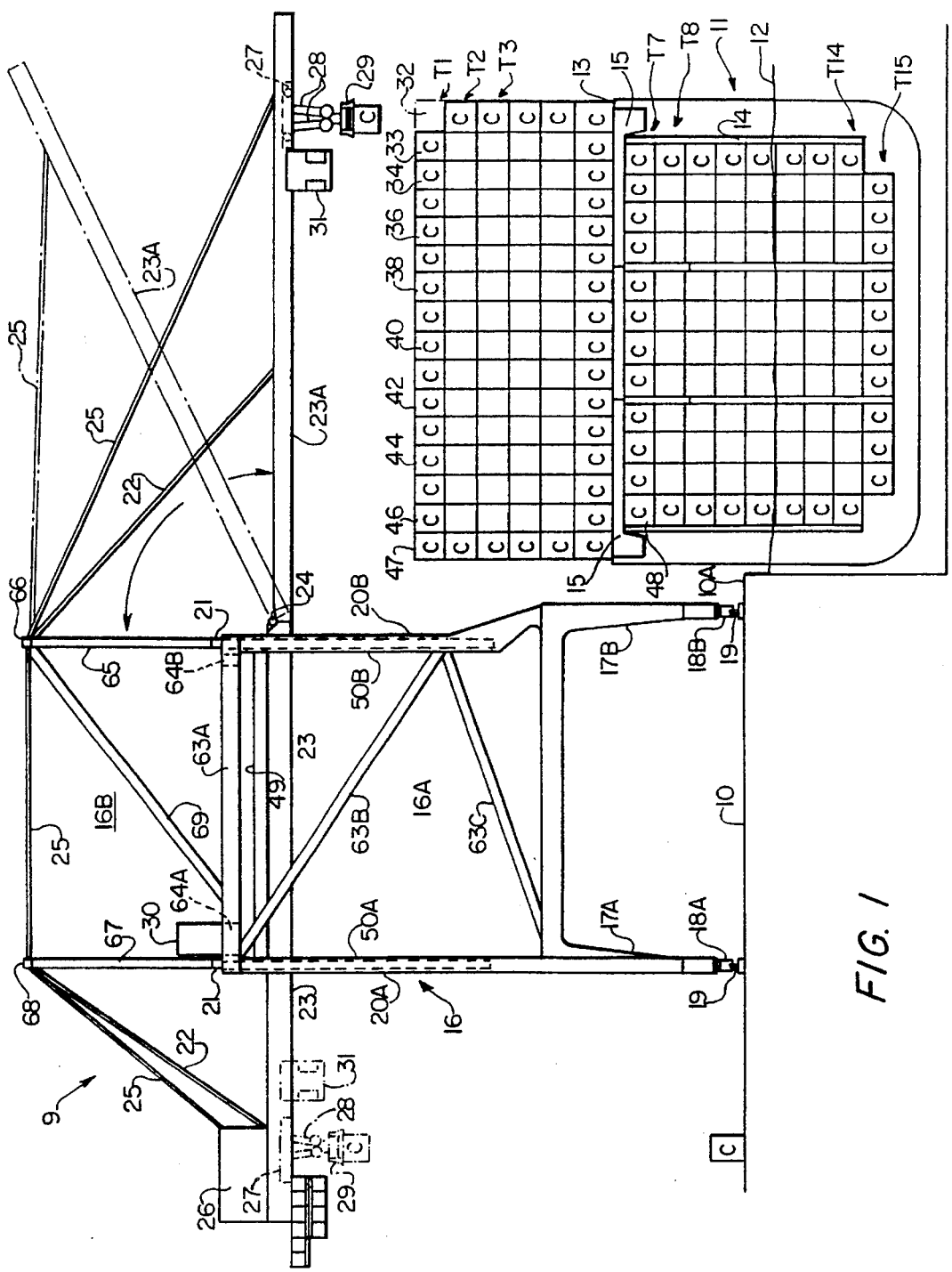
FIG. 1 is a generally diagrammatic side elevation view which illustrates the structure and operation of a crane according to the present invention, whose trolley girder is shown positioned at or near its highest elevation when transferring cargo between a dock and the upper container tiers on the main deck of a ship.

In describing the preferred embodiment of the subject invention illustrated in the drawings, specific terminology is used for the sake of clarity. However, the invention is not intended to be limited to the specific terms so selected, and each specific term includes all technically equivalent terms for steps or devices operating in a similar manner to accomplish a similar purpose.

Referring first to FIG. 1 which is not drawn to scale, it will be seen that a crane 9 constructed according to the invention is located on a dock 10 to which the container ship 11 on water 12 is moored. The ship 11 has cargo containers C located in vertically stacked horizontal tiers T1–T15 (exemplary individual tiers being hereinafter generically referred to as T) both below the main deck 13 in its holds 14 and on the main deck 13 above the hatch covers 15 and deck area. The crane 9 has a main vertical frame assembly 16 provided with four vertical legs 17A, 17B, 17C, 17D (hereinafter collectively referred to as element 17) which support a lower braced superstructure subassembly 16A of frame 16. For illustrative purposes, the two legs 17 located behind legs 17A–17B and farthest from the viewer of FIG. 1 are omitted in the drawing as will be understood by persons familiar with cargo handling equipment of this nature. However, the FIG. 3 waterside or front elevation view of crane 9 does show a third supporting leg 17C which is behind leg 17B in FIG. 1. FIG. 3, as well as other figures in these drawings, also is not to scale and its size has no particular one-to-one relationship to the size of crane 9 in FIGS. 1 and 2. Moreover, the illustrated sizes of various components in the drawings are not necessarily proportional to the sizes of these components in actual practice. Also omitted from the drawings are the customary ladders, stairways and railings used by personnel for access to the upper levels of the crane. The entire crane 9 is moveable parallel to and longitudinally along the waterside edge 10A of dock 10 on support wheel assemblies 18A, 18B, 18C, 18D (hereinafter collectively referred to as element 18) which ride on a set of spaced-apart rails 19.

The lower superstructure assembly 16A has four fixed vertical legs 50A, 50B, 50C, 50D (hereinafter collectively referred to as element 50) which rise from the four support legs 17. Each side of crane 9 has its dockside (rear) and waterside (front) legs 50 braced by a horizontal sill beam 63A connecting their tops, and by the lower diagonal braces 63B and 63C, as shown for the rear leg 50A and front leg 50B in the FIG. 1 side elevation view. Rear and front horizontal shoulder beams 64A and 64B are transversely connected between the two side sill beams 63A and are respectively spaced inwardly from the rear and front ends of these sill beams in order to provide lateral support to the top of superstructure 16A. The front shoulder beam 64B is shown in FIG. 3, behind which is the rear shoulder beam 64A (not visible in FIG. 3) near the rear of the lower superstructure 16A.

An upper braced superstructure subassembly 16B of frame 16 is positioned on the lower superstructure subassembly 16A for movement up and down with respect to the lower superstructure. This upper superstructure 16B includes a vertically moveable platform 49 with corner legs stabilized in a set of guide channels 20A, 20B, 20C, 20D (hereinafter collectively referred to as element 20) on the four vertical legs 50 of superstructure 16A. FIG. 3 shows two such platform front corner legs 49B and 49C which vertically extend a short distance below and above platform 49, and which are respectively associated with the front legs 50B and 50C of the lower superstructure 16A. The two corners at the dockside rear end of platform 49 also have similar short vertical legs like legs 49B and 49C.

This platform 49 of the upper superstructure 16B can be raised and lowered by a set of four motorized elevating winch assemblies 21, or alternatively by hydraulic devices, which are located on sill beams 63A above the tops of the vertical legs 50 of the lower superstructure 16A. A separate winch assembly 21 for each leg 50 is used to adjust the height of the adjacent platform corner leg 49. Each winch assembly is of conventional construction and may consist, for example, of a DC motor driven by a DC motor drive for turning a drum 21A about which four wire ropes 21B are attached. The lower ends of these four ropes are connected to the associated platform corner leg 49 above the center of gravity of the upper superstructure 16B, including its platform 49 and the trolley girder 23/23A connected thereto. A conventional master/slave control system is employed for these four winch assemblies 21 to coordinate and synchronize their operation when vertically moving the platform 49.

FIG. 4 is a top sectional plan view of the fixed lower superstructure vertical leg 50B consisting of a box beam, which also shows its adjacent platform corner leg 49B slidably engaged in the associated guide channel 20B. Guide channel 20B is formed along the length of an exterior wall 51 of leg 50B by two projecting, spaced-apart parallel arms 52. The vertically moveable leg 49B, also a box beam in cross section, has a guide frame 54 formed along the length of its exterior wall 53. Guide frame 54 faces and extends into guide channel 20B so that its two side walls 55 are spaced apart from and are parallel to arms 52 of guide channel 20B. The end wall 56 of guide frame 54 faces and is spaced apart from the exterior wall 51 of leg 50B which also acts as a wall of guide channel 20B. FIG. 4 further shows a pair of horizontal, spaced apart guide rollers 57 near the lower end of leg 49B and below the center of gravity of the upper superstructure 16B and trolley girder 23/23A. Each roller 57 has a horizontally disposed axis 58 which is held parallel to, and within an aperture of, a respective side wall 55 of guide frame 54 so that the guide roller cylindrical surface rolls against the adjacent guide channel arm 52 as leg 49B is vertically moved. Guide rollers 57 therefore prevent lateral motion of leg 49B in the "Y" direction as shown in FIG. 4. Another pair of guide rollers 59 is also provided in end wall 56 of guide frame 54 for rolling against the adjacent guide channel wall 51. These guide rollers 59 will prevent lateral motion of leg 49B in the FIG. 4 "X" direction when acting in concert with corresponding guide rollers 59 on the opposite front leg 49C which is in line with leg 49B along this "X" direction. If necessary, several pairs of guide rollers 57 and 59 may be provided along the length of guide frame 54 to the extent needed for the stability of leg 49B as it is raised or lowered. FIG. 4 is also representative of the mechanical construction of the other three combinations of legs 50 and platform legs found in the crane 9.

Means are also provided in FIG. 4 to positively lock leg 49B in place after its vertical motion ceases. This means can include a horizontal safety shear pin 60 which is slidably retained in a recess 61 formed within a safety assembly 62 that is held by end wall 56 of the guide frame 54. Pin 60 is moved by safety assembly 62, using hydraulic pressure or some other moving force, so that it can extend into or retract from a hole 63 in wall 51 of leg 50B. A plurality of holes 63 are provided along the length of wall 51 so that pin 60 can be engaged with a hole 63 at different elevation levels of leg 49B. Alternatively, pin 60 and safety assembly 62 may be replaced by other arrangements such as a ratcheting cam which engages ridges formed in wall 51 in order to provide more stopping places for leg 49B along leg 50B than can be achieved by the shear pin 60-hole 63 combination.

As part of the upper superstructure 16B, the front of platform 49 also supports a pair of spaced-apart, vertical columns 65 which extend upwardly in front of shoulder beam 64B and whose tops are connected together by a front cross beam 66. As shown in FIGS. 1 and 3, these columns 65 are in line with the front vertical legs 50B and 50C of the lower superstructure 16A. In similar fashion, a pair of spaced-apart, vertical columns 67 in line with the rear vertical legs 50 also extend upwardly from the rear of platform 49 and to the rear of shoulder beam 64A. The tops of columns 67 are joined by a rear crossbeam 68. A pair of spaced apart side braces 69 also extend downwardly from the tops of columns 65 to the rear of platform 49.

The upper superstructure 16B is also connected to and supports an elongated trolley girder 23 which includes a boom member 23A. Trolley girder 23 is attached to the underside of the vertically moveable platform 49, and it is also supported by structural stays 22 which are connected from the tops of the front and rear columns 65 and 67 to girder 23 and its boom 23A. This trolley girder 23 extends horizontally over the dock 10 with its boom 23A also horizontally extending over water 12. Thus, when the upper superstructure 16B is vertically moved by elevating means 21, girder 23 including its boom 23A also is raised or lowered to change its elevation above dock 10 and ship 11. The boom 23A is also hinged along the trolley girder 23 at point 24, allowing the boom 23A to be pivotally raised and stowed when not in use as shown by its dashed line position in FIG. 1 which in practice can be nearly vertical. Boom 23A is rotated around the hinge point 24 by wire cables 25 which are reeved through the tops of columns 65 and 67 of superstructure 16B and are attached to a motorized winch located in a machinery house 26 at the dockside or rear end of trolley girder 23. The stowed boom position allows for the free movement of ships alongside the dock and for the crane to move without interference alongside a moored ship. Alternatively, the trolley girder 23 could be horizontally retracted landside on rollers as a single piece, or be comprised of slidable telescopic sections, so as not to interfere with moored ships or those which are approaching or leaving the dock.

A cargo transfer trolley 27 on wheels or other support means is carried by troller girder 23 and is moveable horizontally along nearly the entire length of the girder including its boom member 23A. Trolley 27 is horizontally moved along girder 23 by conventional wire ropes which are driven by motors also located inside the machinery house 26. Suspended below the trolley 27 by flexible support means, such as a pair of spaced-apart wire ropes 28, is a vertically moveable cargo engaging means like a spreader 29 with conventional twist lock mechanisms at its four corners for removable attachment to the corner castings of a standard cargo container C. The spreader 29 can be vertically lowered to and raised from cargo container locations on dock 10 and ship 11 by the wire ropes 28.

Figure 5:
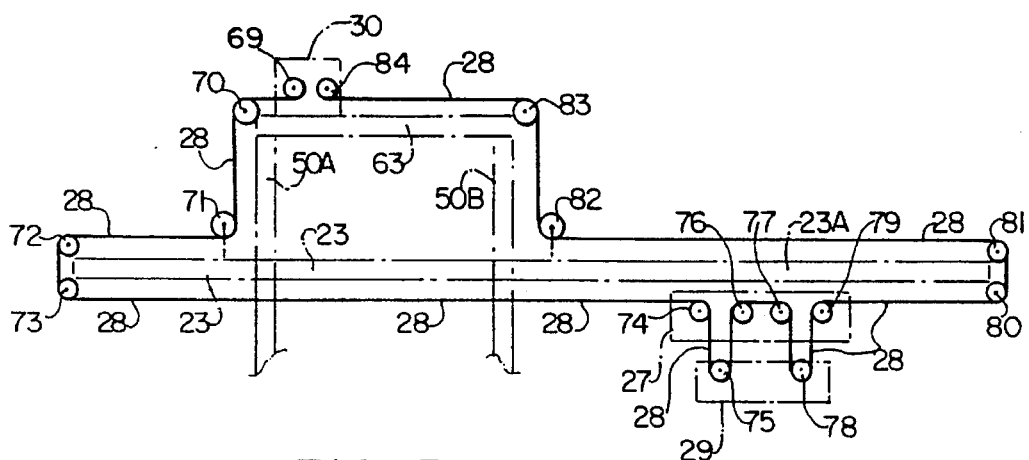
FIG. 5 is a schematic diagram showing the path taken by the cargo hoisting ropes along the crane components.

Hoisting of the container load (i.e., raising the spreader 29 and container C vertically toward the trolley) is accomplished by a motorized winch located in a fixed machinery house 30 on the rear shoulder beam 64A at the top of the lower superstructure 16A. With reference now to FIG. 5, this winch includes a main hoist drum 69 which is connected to the wire ropes 28 that are reeved from machinery house 30 over sheaves 70 on the lower superstructure and down to sheaves 71 on trolley girder 23. Ropes 28 next are reeved over sheaves 72–73 at the girder's rear end and back along girder 23 to the trolley 27 and spreader 29. Trolley sheaves 74 pass the ropes 28 down to the spreader sheaves 75, then back up to the trolley sheaves 76 and 77 from which ropes 28 go back down to spreader sheaves 78. Ropes 28 next go back up to trolley sheaves 79 and then to sheaves 80 and 81 at the waterside end of boom 23A. The ropes 28 then return through sheaves 82 on trolley girder 23 and up by way of the lower superstructure sheaves 83 to the hoist machinery house 30 where they are connected to take up drums 84 for eliminating slack when the upper superstructure 16B is moved vertically. These hoist ropes 28 can be shortened so that spreader 29 is raised sufficiently adjacent to trolley 27, and preferably is held tightly against the trolley, so as to permit large horizontal accelerations and velocities of the trolley with virtually no attendant sway of any cargo container transported thereby. However, this close proximity of spreader 29 to trolley 27 during horizontal travel is not necessarily shown in all the drawings for the sake of simplicity.

Figure 6:
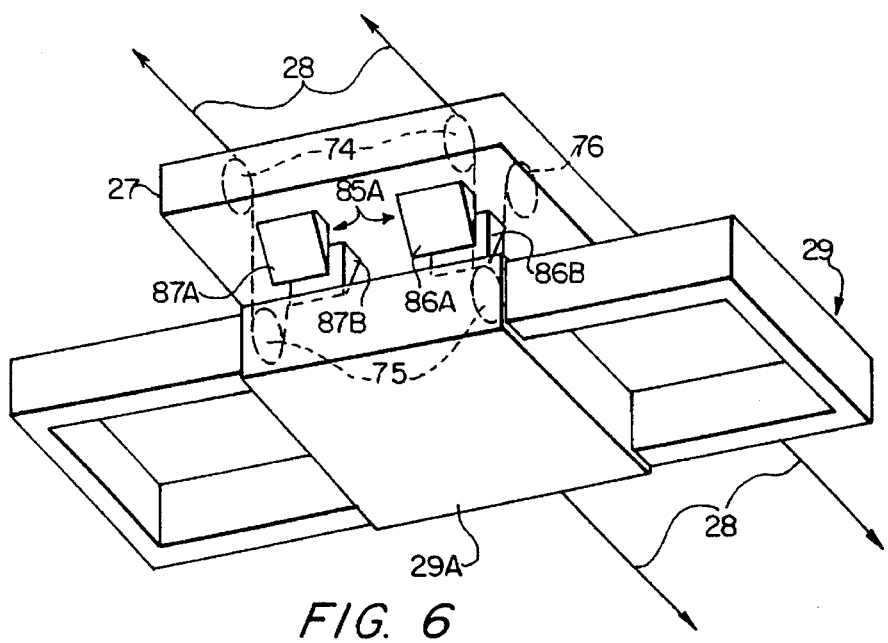
FIG. 6 is a perspective view of a trolley and spreader construction which employs collector assemblies for preventing cargo sway.
Figure 7:
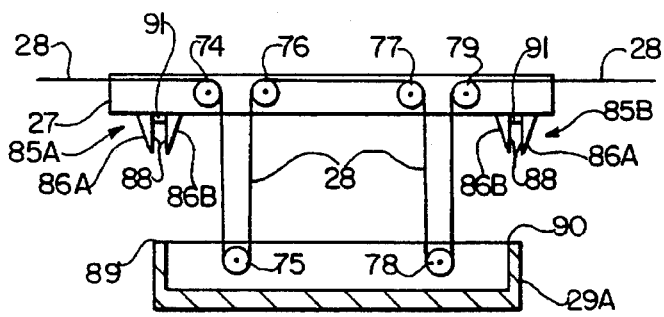
FIG. 7 is a simplified side view of the trolley and spreader components shown in FIG. 6.

Reference is now made to FIGS. 6 and 7 for the details of a trolley 27 and a spreader 29 that permit tight contact between these two devices when transporting cargo. Trolley 27 contains the previously described sheaves 74, 76, 77 and 79 over which pass the pair of hoist ropes 28. A collector assembly 85A is also located on the bottom exterior surface of trolley 27 near the rear end thereof, while another trolley bottom collector assembly 85B is located at the front end of trolley 27. The hoisting ropes 28 extend downwardly between these two collector assemblies. In the preferred embodiment, each collector assembly comprises two transversely aligned pairs of spaced-apart, downwardly extending collector elements 86A–86B and 87A–87B. The collector elements in each pair have opposite facing vertical surfaces 88 which are separated by a gap. The spreader 29 includes the previously discussed sheaves 75 and 78 which are rotatably held in the center box-like member 29A. Box 29A is open at its top, and is of such size that the top edges of its rear and front walls 89 and 90 will fit snugly into the gaps between the pairs of collector elements 86A–86B and 87A–87B. Thus, the trolley collector assemblies will hold the spreader 29 tightly against trolley 27. Compression bumper pads 91 also may be located under trolley 27 in the collector element gaps so that they will make contact with the top edges 89 and 90 of the spreader box 29A. Such pads 91 will permit an even tighter fit of spreader 29 against trolley 27 in order to further reduce load sway at high horizontal accelerations and fast horizontal velocities. Velocities up to or over 1000 feet/min. and accelerations of 6 to 8 feet/sec/sec presently appear to be feasible.

It will be noted in connection with FIGS. 5 and 7 that the hoist ropes 28 vertically fall from trolley 27 to spreader 29 so that the spreader can be hoisted directly into the collector assemblies and there held tightly against the trolley. However, if the trolley/spreader sheaving configuration is such that ropes 28 do not have this straight fall but instead are at an angle with each other as diagrammatically illustrated in FIGS. 1 and 2, collector assemblies may not be appropriate or useful since it may not be possible to lift the spreader high enough to actually contact the trolley. In this case, however, it should still be possible to raise the spreader to be sufficiently adjacent to the trolley for using the opposing tension of ropes 28 so as to permit large horizontal accelerations and velocities of the trolley with virtually no attendant sway of the cargo.

Figure 2:
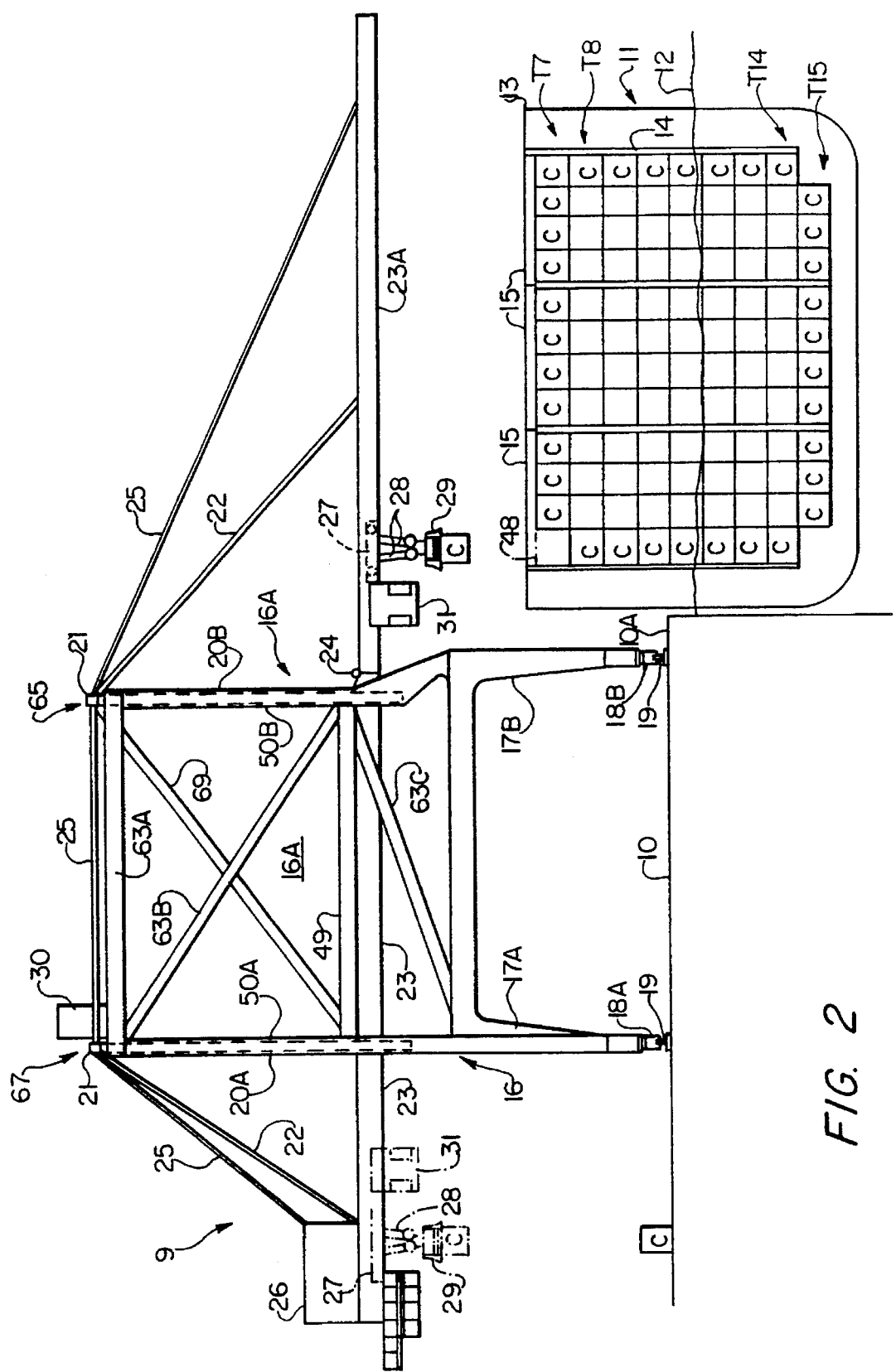
FIG. 2 is the same side elevation view of the FIG. 1 crane when the trolley girder is positioned at or near its lowest elevation during the transfer of cargo between the dock and the hold of a ship.

The operation of all motors and the consequent movements of the trolley 27 and spreader 29 are normally controlled by an operator stationed in a control cab 31 which also is carried by and is free to move horizontally along the outside of trolley girder 23 and its boom 23A under operator control independently of the motion of trolley 27. In the course of operating the system, the trolley 27 and spreader 29 carry containers C between the ship and the dock. It will be recognized by those skilled in the art that statements made herein about movements to and from the dock envision that a container may be landed on or hoisted from the dock itself, a vehicle bed or other equipment located on the dock. The elevation of the upper superstructure 16B and girder 23 is additionally controlled by the operator in cab 31 to the level which minimizes the distance between the spreader 29, when held very close to or tight against the trolley 27, and the highest elevation of a designated container location or the highest obstacle to be cleared by a trolley-suspended container. FIG. 1 shows the trolley girder 23 located at or near its highest elevation level, while FIG. 2 shows girder 23 to positioned at or near its lowest elevation level. Of course, girder 23 can also be vertically moved to various intermediate levels according to what is required by the job at hand, as represented by FIG. 3.

The disclosed crane system of the present invention has many advantages over conventional, single trolley dockside gantry cranes or the several dual trolley dockside gantry cranes that are known in the art. For one thing, the crane operator in moveable cab 31 on the vertically adjustable girder 23 is considerably closer to the location of loading or unloading a container on a ship, as well as being nearer to the point of spotting the position of a container location on the dock. This operator proximity will minimize parallax for the operator so that his ability to position the spreader 29 and/or container C is considerably enhanced. Cab 31 also can move independently on girder 23, rather than being on and moving with the trolley 27, which allows more comfortable travel for the operator between vantage points over the ship and dock. This independently moveable cab 31 further allows large horizontal accelerations and velocities of the trolley 27 without adversely affecting the operator. Because the trolley girder 23 is vertically positioned as close as possible to the designated container location on the ship, the spreader 29 and its engaged container C can be quickly hoisted and held tightly against the trolley 27 so that sway during horizontal movement will be virtually eliminated to allow such large accelerations and velocities which considerably decrease cycle times. Another distinct advantage of the present invention over the dual hoist crane is the reduced complexity of the operating equipment with a consequent reduction in cost. Equally important, there is only one operator, thereby reducing by 50% the labor required to operate this crane as compared to the dual hoist variety. Computer simulations also have shown the crane of this invention to have an almost equivalent throughput capacity as the fastest known dual hoist crane.

The controls for the trolley and spreader movements also may be computerized or otherwise automated to assist the operator of the crane. It is possible with presently available data systems to memorize the coordinates of container locations on the ship as well as the coordinates of container landing positions on the dock, so that the movements of the spreader and the containers can be programmed to automate the cycle in nearly every respect. This automation is enhanced by the fact that virtually no sway is encountered in the horizontal movement of the container from ship to dock, and vice versa. Any minor sway as a result of location spotting movements can be ameliorated through collectors and through minimal operator interface at either end of the cycle. Coordinate locations also can be easily and quickly updated in response to events such as changes in the trolley girder elevation and changes in the ship's draft due to loading or unloading.

The preferred novel methods of operating the disclosed novel crane 9 will now be described in more detail. In general, when a container C is being loaded on board a ship 11 or off loaded therefrom, the trolley girder 23 is vertically positioned at an elevation referred to herein as an "advantageous elevation," which corresponds approximately to the higher of the following:

A. The elevation which, to the extent practical, minimizes the distance between (1) the bottom of the spreader 29 when it is hoisted tightly (or as close as possible) to the trolley 27, and (2) the top of a designated container location on the ship to or from which a container is to be moved, or B. The elevation which, to the extent practical, minimizes the distance between (1) the bottom of a container attached under the spreader 29 when it is hoisted tightly (or as close as possible) to the trolley 27, and (2) the highest obstacle to be cleared by the container when it is moved between the dock and the designated container location on the ship.

In loading a moored ship 11 with containers C that have been delivered to the dock 10, the usual procedure is to first move the crane on rails 19 to a designated longitudinal position along the waterside edge 10A of the dock where the crane then will be used to fill a lower horizontal and transverse tier of container locations on the ship before placing containers in the next higher horizontal tier that is immediately above this filled tier. Thus, after so longitudinally positioning crane next to the ship, the trolley girder 23 initially is vertically moved to the "advantageous elevation" for the designated locations in the first lower tier to be filled with containers during a particular loading period of time. The trolley 27 is then moved over the dock so that its spreader 29 can pick up a container C therefrom. After hoisting this container to the vertical position where the spreader 29 is held tightly (or nearly so) against the trolley 27, the trolley moves horizontally along girder 23 and over the ship to a point immediately above the lower tier designated location where the container is to be placed. The container is then lowered to its resting position on the ship.

These trolley and spreader motions are essentially repeated until this lower tier is filled, whereupon the trolley girder 23 is positioned at the "advantageous elevation" for the designated container locations in the tier immediately above the now-loaded lower tier. This usually requires that the girder 23 be raised if containers are being loaded in tiers above the main deck 13 as shown in FIG. 1. However, when the crane is used first to load containers in any tier below the main deck areas of the ship (i.e., in the hold 14), the trolley girder 23 is usually positioned and maintained at the same "advantageous elevation" such that the tightly hoisted spreader 29 and container C will clear the ship's side hull and any higher obstacle between the dock and the container's designated tier location in the hold. If the main deck at this time is free of interfering containers directly above the hold tier being loaded and there are no significant rails, gunnels or other above deck or dock obstacles, the trolley girder 23 would be positioned either at its lower stops or at an elevation where the tightly hoisted container will just clear the hatch covers 15 if they have not already been removed. Thus, when loading containers below deck, the same "advantageous elevation" of girder 23 will generally be maintained until such loading ceases for any reason. The trolley girder 23 is moved upward in increments, as needed, to successive advantageous elevations as containers are positioned in stacked multi-level tiers above the main deck of the ship. The crane then may be moved to another longitudinal dockside position in order to load containers into ship transverse tiers that are opposite this crane position.

Off loading the vessel is essentially the reverse of the procedure described above, in that the containers in upper tiers are first moved from the ship to the dock and the trolley girder 23 is incrementally lowered, when necessary, to the required advantageous elevations.

When it is desired to remove the hatch covers 15 in the course of off loading or in preparation for loading, this task can be performed using the trolley 27 to take the hatch cover 15 either between the legs 17 of the crane or behind the most landside leg. The hatch cover 15 is then lowered onto the dock surface where it is released so the trolley 27 can return to load or off load the ship.

By way of a particular example, as illustrated in FIG. 1, assume that it is desired to move a container C between the dock 10 and the most waterward container location 32 in the topmost, above deck tier T1 on the ship, either in a landward off loading direction or in the waterward loading direction. The upper superstructure 16B with trolley girder 23 is preliminarily moved to the advantageous girder elevation that allows the bottom of this container C to clear by a very short distance the containers C in tier locations 33–47 when the spreader 29 is hoisted tightly against the trolley 27. However, this clearance distance as well as the spreader-trolley distance are exaggerated in the non-scale FIG. 1 for the sake of simplicity. The container C then is transferred by the trolley 27 from its initial location on the ship or the dock to its appropriate destination. This advantageous elevation for container location 32 also would be the advantageous elevation for containers moved to or from inner tier locations such as 36, 38 and 40, for example. Alternatively, the advantageous elevation for the most landward container location 47 in tier T1 can be approximately one tier lower so as to minimize the distance between the bottom of the tightly hoisted spreader 29 and the top of container location 47, since there are no intervening obstacles between this location and the dock.

Now assume that it is desired to remove a container C from tier location 48 of tier T7 in the hold 14 of the FIG. 2 ship where there are no above deck containers over this location. The trolley girder 23 is moved to its lowest elevation shown in FIG. 2, where it will remain during the unloading of any container from the vertically stacked horizontal tiers T7–T15, provided there are no containers still remaining on the deck above these tiers. This advantageous elevation will permit the bottom of any removed container to clear the ship's side hull as the container is transferred landward by trolley 27 with spreader 29 held tightly against the trolley.

In summary, it will be appreciated that in order to minimize vertical container movements and allow large horizontal trolley accelerations and velocities, the trolley girder should be positioned in its lowest possible elevation that allows clearance of the trolley, spreader, and container over any remaining obstacles between ship and dock while having the spreader held tightly, or nearly so, against the trolley. Thus, it is evident that this invention provides an extremely simple and versatile system and method which can significantly speed up the rate at which containers are loaded and unloaded from container vessels. This advantage over other prior art cranes accrues because of reduced operator parallax, closer operator proximity to the attaching/detaching container locations, and greater horizontal accelerations and velocities heretofore unobtainable because of load sway below the trolley during horizontal travel.

Modifications and variations of the above-described embodiment of the present invention are possible, as will be appreciated by those skilled in the art in light of the above teachings. It therefore is to be understood that, within the scope of the appended claims and their equivalents, the invention may be practiced otherwise than as specifically described.

What is claimed:

1. In a dockside crane for moving cargo in a cargo transfer operation between a dock and a vessel, the combination comprising:

(a) vertical frame means including a support structure which rests on the dock near a waterside edge thereof;

(b) elevatable girder means attached to said vertical frame means and extending horizontally over the dock and the water adjacent the dock where the vessel can be moored for loading or unloading cargo;

(c) elevating means for vertically raising and lowering said girder means to change its elevation above the dock and the vessel;

(d) cargo transfer means carried by said girder means and horizontally moveable therealong over the dock and the vessel;

(e) cargo engaging means suspended below said cargo transfer means by flexible support means and which can be vertically lowered to and raised from cargo locations on the dock and on the vessel; and (f) operator cab means, carried by said elevatable girder means and horizontally moveable therealong over the dock and the vessel so that a volume of space defined by travel of the operator cab means does not overlap respective volumes of space defined by motion of the cargo transfer means and the cargo engaging means, so that:

1) motion of the operator cab means is anywhere in a substantially vertical planar area defined by the operator cab means' horizontal motion along the girder means and by vertical elevation of the girder; and 2) motion of the operator cab means is independent of motion of said cargo transfer means and unhindered by the cargo transfer means throughout the entire cargo transfer operation, so that an operator can move the operator cab means to view the cargo transfer means from different relative positions in the vertical planar area and from different relative angles.

2. The crane according to claim 1, wherein said cargo engaging means can be raised sufficiently adjacent to said cargo transfer means so as to permit large horizontal accelerations and velocities of said transfer means with virtually no attendant sway of any cargo being transported thereby.

3. The crane according to claim 2, wherein said cargo engaging means can be raised tightly against said cargo transfer means.

4. The crane according to claim 1, wherein said vertical frame means includes a superstructure assembly connected to said girder means and which can be vertically raised and lowered by said elevating means.

5. The crane according to claim 1, wherein said vertical frame support structure is longitudinally moveable along the waterside edge of said dock.

6. The crane according to claim 1, wherein that part of said girder means which extends over water can be removed from interfering with the vessel when there is relative motion between the vessel and said crane.

7. The crane according to claim 1, wherein said cargo engaging means can be raised sufficiently adjacent to said cargo transfer means so as to permit large horizontal accelerations and velocities of said transfer means with virtually no attendant sway of any cargo being transported thereby.

8. The crane according to claim 7, wherein said cargo engaging means can be raised tightly against said cargo transfer means.

9. The crane according to claim 1, wherein said vertical frame means includes a lower superstructure assembly with vertical legs, an upper superstructure assembly which can be vertically raised and lowered by said elevating means and which has vertical legs each slidably engaged with a respective vertical leg of said lower superstructure, and means connecting said upper superstructure assembly with said girder means.

10. The crane according to claim 9, wherein each said upper superstructure vertical leg includes guide roller means for engaging guide channel means on a lower superstructure vertical leg.

11. The crane according to claim 9, wherein said cargo engaging means can be raised sufficiently adjacent to said cargo transfer means so as to permit large horizontal accelerations and velocities of said transfer means with virtually no attendant sway of any cargo being transported thereby.

12. The crane according to claim 11, wherein said cargo engaging means can be raised tightly against said cargo transfer means.

13. The crane according to claim 3, which further includes means located on said cargo transfer means for receiving part of said cargo engaging means.

14. The crane according to claim 8, which further includes means located on said cargo transfer means for receiving part of said cargo engaging means.

15. The crane according to claim 1, wherein said flexible support means includes reeving means located on said vertical frame means and said girder means.

16. A crane for moving a container from a source location to a destination location in a container moving operation, the arrangement including:

a) at least one generally horizontal girder;

b) a trolley, movable horizontally along the at least one girder, and including means for grasping the container;

c) trolley moving means for moving the trolley horizontally from above the source location to above the destination location;

d) a movable work station including control means for allowing an operator to control at least:

1) the grasping means;

2) the trolley moving means; and 3) work station moving means for moving the work station independently of the movement of the trolley throughout the entire container moving operation and unhindered by the trolley, and for allowing the operator to move the work station in front of or behind the trolley to view the trolley and container from different relative positions in front of and behind the trolley, and from different relative angles in front of and behind the trolley; and e) the work station moving means.

17. The crane of claim 16, wherein the work station is disposed on one of the at least one girder so that the trolley and work station are at substantially the same height.

18. The crane of claim 16, further comprising:

girder moving means for moving one of the at least one girder vertically up or down.

19. The crane of claim 18, wherein the work station is disposed on one of the at least one girder so that the trolley and work station are at substantially the same vertical height.

20. The crane of claim 16, wherein:

the crane further comprises means for elevating the at least one girder to different heights; and the work station moving means and girder elevating means collectively constitute means for moving the work station anywhere in a substantially vertical planar area defined by horizontal motion of the work station along the at least one girder and the heights of the at least one girder.

21. A crane for moving a container from a source location to a destination location in a container moving operation, the arrangement including:

a) at least one generally horizontal girder;

b) a trolley, movable horizontally along the at least one girder, and including means for grasping the container;

c) trolley moving means for moving the trolley horizontally from above the source location to above the destination location;

d) a movable work station including control means for allowing an operator to control at least:
1) the grasping means;
2) the trolley moving means; and
3) work station moving means for moving the work station independently of the movement of the trolley throughout the entire container moving operation and unhindered by the trolley, and for allowing the operator to move the work station with respect to the trolley to view the trolley and container from different relative positions and from different relative angles; and e) the work station moving means, constituting means for moving the work station along the girder from a position on one side of the container to a position on the other side of the container at any time during the container moving operation, so that the operator can view the container being raised and lowered, from different relative positions and from different relative angles.

22. A crane for moving a container from a source location to a destination location in a container moving operation, the arrangement including:

a) at least one generally horizontal girder;

b) a trolley, movable horizontally along the at least one girder, and including means for grasping the container;

c) trolley moving means for moving the trolley horizontally from above the source location to above the destination location;

d) a movable work station including control means for allowing an operator to control at least:
1) the grasping means;
2) the trolley moving means; and
3) work station moving means for moving the work station, unhindered by the trolley, independently of the movement of the trolley throughout a portion of the container moving operation when the trolley raises or lowers the container, and for allowing the operator to move the work station in front of or behind the trolley to view the trolley and container from different relative positions in front of or behind the trolley and from different relative angles in front of or behind the trolley, as the container is raised or lowered; and e) the work station moving means.

23. The crane of claim 22, wherein:

the crane further comprises means for elevating the at least one girder to different heights; and the work station moving means and girder elevating means collectively constitute means for moving the work station anywhere in a substantially vertical planar area defined by horizontal motion of the work station along the at least one girder and the heights of the at least one girder.

24. A crane for moving a container from a source location to a destination location in a container moving operation, the arrangement including:

a) at least one generally horizontal girder;

b) a trolley, movable horizontally along the at least one girder, and including means for grasping the container;

c) trolley moving means for moving the trolley horizontally from above the source location to above the destination location;

d) a movable work station including control means for allowing an operator to control at least:
1) the grasping means;
2) the trolley moving means; and
3) work station moving means for moving the work station, unhindered by the trolley, independently of the movement of the trolley throughout a portion of the container moving operation when the trolley raises or lowers the container, so that the operator can move the work station with respect to the trolley to view the trolley and container from different relative positions and from different relative angles as the container is raised or lowered; and e) the work station moving means, constituting means for moving the work station along the girder from a position on one side of the container to a position on the other side of the container at any time during the container moving operation, so that the operator can view the container being raised and lowered, from different relative positions and from different relative angles.

25. A crane for moving a container from a source location to a destination location in a container moving operation, the arrangement including:

a) at least one generally horizontal girder;

b) a trolley, movable horizontally along the at least one girder, and including means for grasping the container;

c) trolley moving means for moving the trolley horizontally from above the source location to above the destination location;

d) a movable work station including control means for allowing an operator to control at least:
1) the grasping means;
2) the trolley moving means; and
3) work station moving means for moving the work station, unhindered by the trolley, independently of the movement of the trolley throughout a portion of the container moving operation when the trolley raises or lowers the container, for allowing the operator to move the work station in front of and behind the trolley to view the trolley and container from different relative positions in front of and behind the trolley, and from different relative angles in front of and behind the trolley, as the container is raised or lowered; and e) the work station moving means;

wherein the trolley moving means constitutes means for moving the trolley at large accelerations and large decelerations independently of motion of the work station, to reduce the duration of the container moving operation while avoiding dangerous accelerations and decelerations on the work station.

26. The crane of claim 25, wherein:

the trolley moving means constitutes means for moving the trolley at a velocity larger than the work station moving means moves the work station.

27. The crane of claim 25, wherein:

the crane further comprises means for elevating the at least one girder to different heights; and the work station moving means and girder elevating means collectively constitute means for moving the work station anywhere in a substantially vertical planar area defined by horizontal motion of the work station along the at least one girder and the heights of the at least one girder.

28. A crane for moving a container from a source location to a destination location in a container moving operation, the arrangement including:

a) at least one generally horizontal girder;

b) a trolley, movable horizontally along the at least one girder, and including means for grasping the container;

c) trolley moving means for moving the trolley horizontally from above the source location to above the destination location;

d) a movable work station including control means for allowing an operator to control at least:
1) the grasping means;
2) the trolley moving means; and
3) work station moving means for moving the work station, unhindered by the trolley, independently of the movement of the trolley throughout a portion of the container moving operation when the trolley raises or lowers the container, so that the operator can move the work station with respect to the trolley to view the trolley and container from different relative positions and from different relative angles as the container is raised or lowered; and e) the work station moving means, constituting means for moving the work station along the girder from a position on one side of the container to a position on the other side of the container at any time during the container moving operation, so that the operator can view the container being raised and lowered, from different relative positions and from different relative angles;

wherein the trolley moving means constitutes means for moving the trolley at large accelerations and large decelerations independently of motion of the work station, to reduce the duration of the container moving operation while avoiding dangerous accelerations and decelerations on the work station.

29. A method of moving cargo between a source location and a destination location in a cargo transfer operation, using a crane having at least one vertically movable girder with a work station disposed on one of the at least one girder, and a trolley, the method comprising the following steps, not necessarily in the recited order:

moving the cargo between the source and destination locations in the cargo transfer operation, by moving the trolley between the source and destination locations;

vertically moving the at least one girder with the work station; and horizontally moving the work station, independently of motion of the trolley and without hindrance by the trolley, throughout the cargo transfer operation;

wherein the vertically moving step and the horizontally moving step collectively constitute a step of allowing an operator in the work station to view the trolley and cargo from different relative positions in front of and behind the trolley, and from different relative angles in front of and behind the trolley, throughout the entire cargo transfer operation.

30. A method of moving cargo between a source location and a destination location in a cargo transfer operation, using a crane having at least one vertically movable girder with a work station disposed on one of the at least one girder, and a trolley, the method comprising the following steps, not necessarily in the recited order:

moving the cargo between the source and destination locations in the cargo transfer operation, by raising the cargo from the source location, moving the trolley between the source and destination locations, and lowering the cargo to the destination location;

vertically moving the at least one girder with the work station; and horizontally moving the work station, independently of motion of the trolley and without hindrance by the trolley, throughout the raising and lowering steps;

wherein the vertically moving step and the horizontally moving step collectively constitute a step of allowing an operator in the work station to view the trolley and cargo from different relative positions in front of and behind the trolley, and from different relative angles in front of and behind the trolley, throughout the raising and lowering steps.

* * * * *